United States Patent

Vähä-Antila et al.

[11] Patent Number: 5,974,833
[45] Date of Patent: Nov. 2, 1999

[54] HEAT TRANSFER METHOD IN GLASS SHEET BENDING OVEN AND A BENDING OVEN

[75] Inventors: Kari Vähä-Antila, Nokia; Juha Karisola, Viiala, both of Finland

[73] Assignee: Glassrobots OY, Finland

[21] Appl. No.: 09/051,971

[22] PCT Filed: Oct. 22, 1996

[86] PCT No.: PCT/FI96/00557

§ 371 Date: Aug. 18, 1998

§ 102(e) Date: Aug. 18, 1998

[87] PCT Pub. No.: WO97/15531

PCT Pub. Date: May 1, 1997

[30] Foreign Application Priority Data

Oct. 24, 1995 [FI] Finland ................................ 955060

[51] Int. Cl.⁶ .............................................. C03B 23/023
[52] U.S. Cl. ................... 65/102; 65/106; 65/111; 65/118; 65/273; 65/290; 65/291; 65/307; 65/361; 34/430; 34/629; 432/77; 432/78; 432/120; 432/144; 432/145; 432/152
[58] Field of Search ........................ 65/102, 104, 106, 65/111, 118, 273, 290, 291, 307, 361; 34/71, 430, 629; 219/388, 394, 400; 432/77, 78, 120, 144, 145, 152

[56] References Cited

U.S. PATENT DOCUMENTS

| | | | |
|---|---|---|---|
| 3,431,095 | 3/1969 | Ross | 65/104 |
| 3,711,265 | 1/1973 | Jadin | 65/104 |
| 4,497,645 | 2/1985 | Peltonen | 65/104 |
| 4,755,204 | 7/1988 | Boardman et al. | 65/106 |
| 4,986,842 | 1/1991 | Peltonen | 65/104 |
| 5,066,320 | 11/1991 | Lehto et al. | 65/106 |
| 5,292,355 | 3/1994 | Nikander | 65/104 |
| 5,472,469 | 12/1995 | Yli-Vakkuri et al. | 65/104 |
| 5,679,123 | 10/1997 | Bennett et al. | 65/102 |

FOREIGN PATENT DOCUMENTS 0 370 313   5/1990   European Pat. Off. .

*Primary Examiner*—Peter Chin
*Assistant Examiner*—Michael P. Colaianni
*Attorney, Agent, or Firm*—Larson & Taylor

[57] ABSTRACT

A heat transfer method in a glass bending furnace, which has a top array of of successive heating sections (2) and under it a bottom array of successive cooling sections (3), and in which method glass sheets are conveyed on bending molds in mold carrying wagons on the top conveyor track from one heating section (2) to the next and on the bottom conveyor track from one section (3) to the next and the air heated by the bent hot glasses is sucked from cooling section (3) and blasted to the non-bent colder glasses in the heating sections (2). In order to intensify heat transfer, air sucked from the cooling section (3) is blasted as such, against the travel direction of the mold carrying wagons through the heating sections (2) to non-bent colder glass sheets in one of the heating sections (2) preceding the heating section (2) directly above the cooling section (3) from which the heated air is drawn as viewed in a direction of travel of the mold carrying wagons through the heating sections (2).

4 Claims, 1 Drawing Sheet

HEAT TRANSFER METHOD IN GLASS SHEET BENDING OVEN AND A BENDING OVEN

FIELD OF THE INVENTION

The invention relates to a heat transfer method and an applicable glass bending furnace having a top array of successive heating sections and a bottom array of successive cooling sections in which air heated by hot bent glass sheets is drawn from the cooling sections and blasted into the heating sections.

BACKGROUND OF THE INVENTION

Previously known from the Finnish patent 68390 is intensification of heat transfer in a double-decker glass bending furnace, where heat transfer is effected vertically between sections one on top of another by means of radiation and gravitational convection. The bottom of the mold carrier wagons is open enabling radiation and convection from the hot glass sheet on the bottom track section to the colder glass sheet on the top track section.

Further, a method to intensify heat transfer is known from patent FI-81331, where in comparison with the above solution, fans are installed to increase heat transfer from the bottom track section to the top track section.

Not even the last mentioned solution has turned out effective enough, because it works effectively only for a few seconds when the mold carrier wagons have reached a new position. There is then during this short moment enough difference of temperature for significant heat transfer. However, since the mold carrying wagons always stay for a time span of 1.5–3 minutes in a section before they are shifted over to the next section, the use of fans is quite useless.

SUMMARY OF THE INVENTION

A method and bending furnace as per this invention offer a significant improvement of heat transfer and significantly longer lasting heat transfer per each cycle.

According to the invention, glass sheets on bending molds in mold carrying wagons are conveyed through the heating sections and then through the cooling sections by mold carrying wagons. Hot air produced by the hot bent glass sheets is drawn from the cooling sections and then blasted in a direction opposite the direction of travel of the mold carrying wagons to colder glass sheets in the heating sections. In particular, the heated air is blasted into a heating section which precedes the heating section directly above the cooling section from which the hot air is drawn by means of air channels and fans. A return air channel system is used to return air from a given heating section into the cooling section directly below the heating section or adjacent thereto.

By means of the method and bending furnace of this invention the transfer of heat from the bottom track section to the top track section and the glass therein is instensified to a considerable extent. A substantial portion of intensification is based on the increased available temperature difference between the bottom track glass and the top track glass, to which air is blasted from the bottom track section.

BRIEF DESCRIPTION OF THE DRAWINGS

In the following, the invention is disclosed with reference to the enclosed drawing, where.

Figure 1:
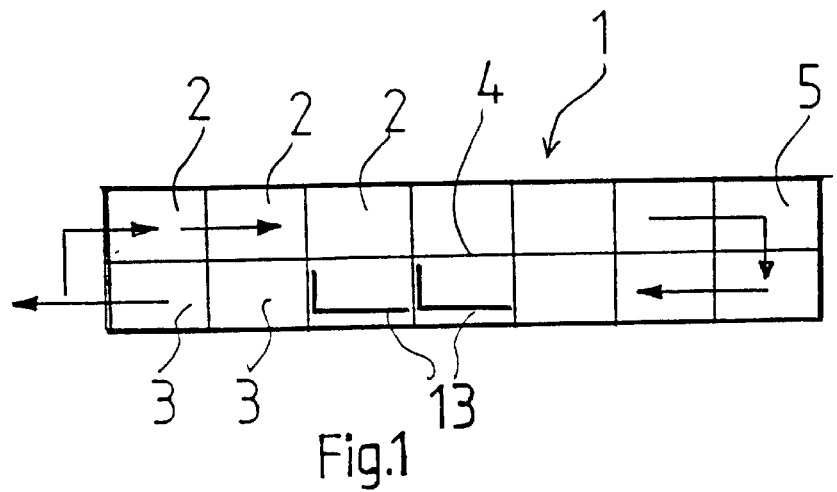
FIG. 1 shows a bending furnace schematically in a side view.

The arrows in the schematic view of FIG. 1 show the travel direction of mold carrying wagons and the glass sheets upon them in furnace 1. For instance, on the top track there are six sections 2, where the glass sheet is heated, and a section, where bending takes place and where the mold carrying wagon is lowered onto the bottom track. There are, for instance, on the bottom track six cooling sections 3. In the figure two mold carrying wagons 13 are illustrated by way of example.

Figure 2:
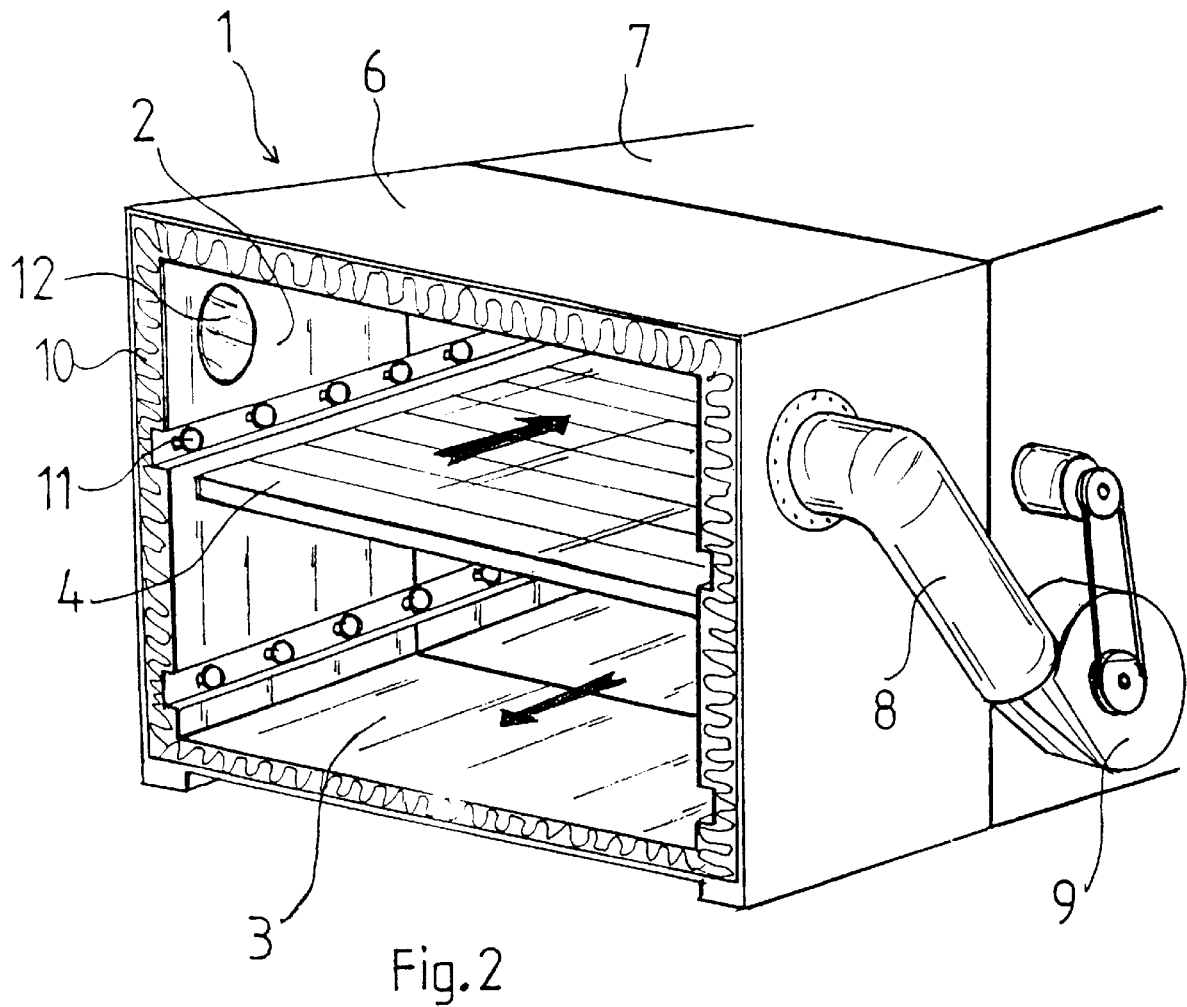
FIG. 2 shows a perspective view of successive bending furnace sections with bottom track and top track.

FIG. 2 is a view of some sections 6 and 7, which are individually-built, successive segments joined together to form a successive furnace. There is a floor 4 between the top track and the bottom track. On both sides of sections 6,7 there are wheels 11 partly embedded in insulation 10 and fastened by bearings to roll for conveyance of the mold carrying wagons 13. At least as one wagon end, the mold carrying wagons 13 have an insulated partition wall dividing the top track lengthwise into sections 2 and the bottom track into sections 3. Most advantageously, the wagon has an insulated bottom, whereby the illustrated floor 4 is not needed to cover the whole furnace length. If wagon 13 is without bottom, a floor 4 is needed.

In the figure, air channels 8 and a fan 9 assembly are shown where, as per prior art, air from the bottom section 3 is not blasted to the top section 2 upon it but to its adjacent section against the travel direction of the carrier wagons. From top section 2, into which air is blasted, air is discharged downward along channel 12 either back to the same section from where it was sucked or to the section under it or its adjacent section 3.

Thanks to this solution greater transfer of heat from the glass on the bottom track to the glass on the top track glass is achieved, since the temperature difference between sections is even 100° C. higher than the difference of temperature between face-to-face sections. If blasting is channelled to the top track so slantly that one section is passed, an even greater difference of temperature is achieved. It is possible to steer the blasting in full from the top track to one or several random sections, but it is also possible to discharge a portion of the blast out from the furnace completely.

We claim:

1. A method of heat transfer in a glass sheet bending furnace having a top array of successive heating sections having heating means and a bottom array of successive cooling sections, the method comprising:

conveying glass sheets on bending molds in mold carrying wagons on a top conveyor track from one of said heating sections to another of said heating sections whereby said glass sheets are heated to a temperature sufficient to bend said glass sheets, and to a bottom conveyor track to one of said cooling sections and to subsequent cooling sections to convey said heated glass sheets, heating air in said cooling sections by transfer of heat from hot bent glass sheets;

drawing said heated air from one of said cooling sections; and blasting said heated air in a direction opposite a direction of travel of said mold carrying wagons through said heating sections to non-bent colder glass sheets in one of the heating sections preceding the heating section directly above said cooling section from which said heated air is drawn as viewed in a direction of travel of said mold carrying wagons through said heating sections.

2. The method according to claim 1 further comprising the step of returning a majority of air to one of the cooling sections directly below, or adjacent the cooling section directly below, the heating section into which heated air was directed during said step of blasting.

3. A glass sheet bending furnace comprising:

a glass sheet bending furnace having a top array of successive heating sections having heating means and a bottom array of successive cooling sections;

conveying glass sheets on bending molds in mold carrying wagons on a top conveyor track from one of said heating sections to another of said heating sections for heating said glass sheets to a temperature sufficient to bend said glass sheets, and to a bottom conveyor track to one of said cooling sections and to subsequent cooling sections to convey said heated glass sheets, air channels between said heating sections and said cooling sections, each of said air channels including a fan arranged for blasting air drawn from the cooling sections against the direction of travel of said mold carrying wagons in said heating sections to one of the heating sections preceding the heating section directly above the cooling section from which the air, heated by the transfer of heat from hot bent glass sheets, is drawn as viewed in a direction of travel of said mold carrying wagons through said heating sections; and a return air channel system for returning air from the heating sections into respective cooling sections, air from a selected one of the heating sections being returned to the cooling section directly below, or adjacent the cooling section directly below the selected heating section.

4. A glass sheet bending furnace according to claim 3 wherein successive cooling sections and successive heating sections are separated by back walls of the mold carrying wagons.

\* \* \* \* \*